Nov. 6, 1956         F. L. STEVENS         2,769,207
METHOD FOR DISPENSING AND APPLYING HIGHLY VISCOUS CEMENTS
Filed Dec. 24, 1954
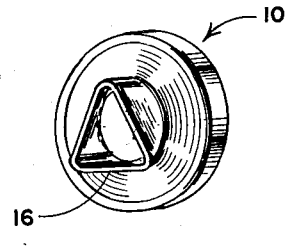
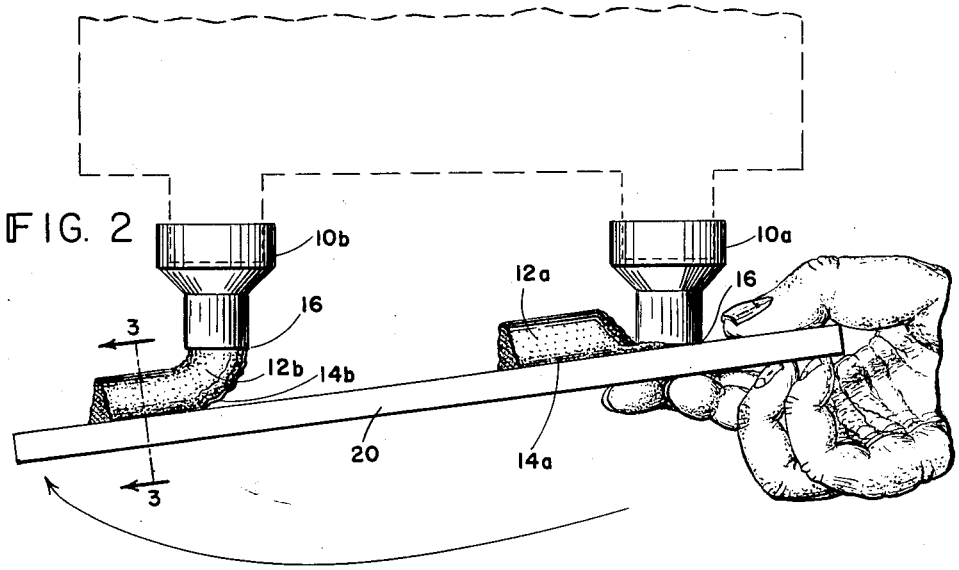
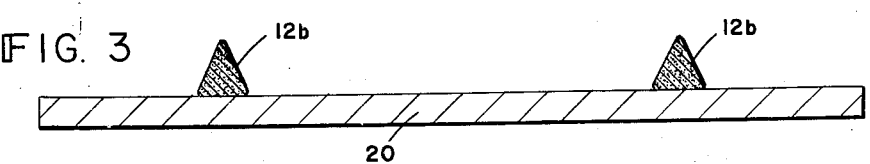
INVENTOR.
FRANK L. STEVENS

United States Patent Office 2,769,207
Patented Nov. 6, 1956

2,769,207

METHOD FOR DISPENSING AND APPLYING HIGHLY VISCOUS CEMENTS

Frank L. Stevens, Lexington, Mass., assignor to W. F. Webster Cement Company, Cambridge, Mass., a voluntary association of Massachusetts Application December 24, 1954, Serial No. 477,542

1 Claim. (Cl. 18—59)

This application relates to a method for discharging or dispensing and applying highly viscous materials, such as cements or adhesives of the type used in applying tiles or the like.

In the applying of tiles, such as ceiling or acoustical tiles, a very viscous and adhering type of cement is employed. Until very recently, the tile layer has applied cement to each tile manually with a paddle, dipping the latter into a five-gallon can of adhesive from time to time. Various mechanical expedients have been proposed for discharging adhesive on the job as required, and in my copending application S. N. 382,283, filed September 25, 1953, I have described a novel structure particularly well adapted to accomplish this in a satisfactory manner.

In applying tiles of the character above described, an important objective is to use the minimum amount of cement while at the same time doing an effective job. Also, it is important to lay down a fairly high pile of cement, say ½″ to ¾″, because ceilings are often uneven, and if the tile is to be laid evenly, substantial gaps between tile and underlying ceiling must often be bridged with adhesive. An additional reason for a high pile's being preferable is that cements of the character described often quickly form a relatively unadhesive "skin" on contact with air, and it is desirable that the pile be high enough so that in applying the tile to a ceiling or wall the cement is crushed sufficiently to rupture this "skin." A further complicating factor is that many highly viscous cements are so stringy that if a rod of cement is slowly extruded downwardly through an orifice onto a tile, the rod cannot be broken by quickly dropping the tile a few inches. Instead, the rod just strings out.

Accordingly, it is one objective of the present application to provide a method of dispensing and applying highly viscous materials which provides a deposit of uniform height and also of height large in relation to the volume of cement required.

Another object is to provide such a method in which the cement deposited does not tend to flatten out to any substantial degree of its own weight.

It is a further object to provide such a method in which even a stringy, highly viscous cement may be handled with facility, a "rod" of the same being cut off neatly and accurately as desired at any point in the extension of the same.

A further object is to provide such a method in which the deposited cement has great mechanical stability, and does not tend to tip over or otherwise lose any of its effective height.

Generally speaking, my new method provides for extruding a triangular (in cross-section) "rod" of viscous cement and depositing it on its side onto a tile. The rod is cut off at the desired point against the edge of the nozzle through which the rod is extruded, said edge being linear to permit a clean cut-off of cement when the tile is pressed and scraped thereagainst. Normally a multiplicity of rods are extruded simultaneously, each rod being similarly deposited on the tile and cut off between the tile and the edge of its respective nozzle, said edges being generally parallel.

Other objects, advantages and features will appear from the following description of a preferred embodiment, taken together with the attached drawings of the same, in which:

Fig. 1 is a perspective view of a nozzle through which viscous cement may suitably be extruded in accordance with my invention;

Fig. 2 is a side elevation of a dispensing machine including nozzles according to my invention, showing the method according to which I extrude and apply onto a tile such viscous cement; and Fig. 3 is a section at 3—3 in Fig. 2, showing the cross-sectional appearance of the deposited cement in position on a tile.

Referring now to the drawings in more detail, there is shown in Fig. 1 a nozzle generally indicated at 10. Said nozzle has a triangular orifice 11. In my preferred method I mount four such nozzles on suitable apparatus, for extrusion of viscous cement therethrough. Apparatus of the general character of that disclosed in my copending application above referred to, omitting the cutoff device there described, is suitable for this purpose. The number of nozzles used may be varied as desired.

As indicated in Fig. 2, one pair of nozzles 10a is nearer to the position at which an operator stands than another pair 10b.

As cement is extruded through these nozzles 10, and after a substantial amount of the same has passed through said nozzles and is dependent therefrom, a tile 20 is moved to engage the extruded rods 12a along the sides 14a thereof nearer the worker, as shown in Fig. 2. The tile 20 is given a generally rotary motion as indicated by the arrow, so that the nearer rods 12a are deposited on said near sides 14a thereof on the tile 20, and the farther rods 12b are then similarly engaged and deposited on the near sides 14b thereof on the tile 20. The rods are cut off by scraping said tile against the linear edges nearer the worker 16 of the respective nozzles. All of said nozzle cutoff edges 16 are generally parallel in order to make this method of cutting off the rods workable. The nearer rods 12a are cut off shortly before the farther rods 12b are cut off, normally, though all rods 12 may be cut off at approximately the same time, engagement therewith and deposit thereof having previously been carried out as described above.

The volume of cement deposited can be varied as desired by varying the length of rod deposited.

I prefer to give to the rods a cross-section that is not only triangular, but that of an isosceles triangle, deposit on a tile being along the base thereof. When a multiplicity of nozzles are used, I prefer to provide said nozzles with parallel linear edges 16 along the portions of the orifices therein corresponding to said bases, it being against these edges 16 that the rods of cement are cut off by the tile.

Through deposit of cement on the side of an extruded rod rather than squirting it directly onto a tile my method gives uniform deposit height. By deposit through a nozzle with a linear edge toward the operator and cutting off the rod as desired thereagainst it is possible to obtain a clean cutoff.

By providing for a triangular cross-section during extrusion I obtain maximum height per unit volume of cement used, with consequent advantages in gap bridging and skin rupturing, as described above, as well as obtaining a deposit which does not tend to tip over and which does not tend to flatten out of its own weight. These advantages are at their greatest when the triangular configuration is isosceles.

Other embodiments within the spirit of my invention, other than the preferred embodiments described, will occur to those skilled in the art.

I claim:

The method of applying viscous cement to tiles and similar units which includes the steps of extruding triangular rods of said cement through a multiplicity of nozzles at varying distances from an operator's position, engaging said rods nearer to said operator's position along sides thereof nearest thereto with the top surface of a unit, moving said unit in an arc to deposit therealong said nearer rods on said sides thereof and to similarly engage corresponding sides of rods farther from said operator's position and to deposit along said unit said farther rods on said sides thereof, and cutting off said rods by scraping said unit against a linear edge on each of said nozzles.

References Cited in the file of this patent

UNITED STATES PATENTS

| | | |
|---|---|---|
| 1,126,996 | Hassler | Feb. 2, 1915 |
| 2,220,119 | Pasanen | Nov. 5, 1940 |
| 2,548,340 | Bower | Apr. 10, 1951 |
| 2,715,484 | Alexander | Aug. 16, 1955 |